June 6, 1950      E. F. MORGAN      2,510,829
VEHICLE SPRING SUSPENSION
Filed May 6, 1949      2 Sheets-Sheet 1
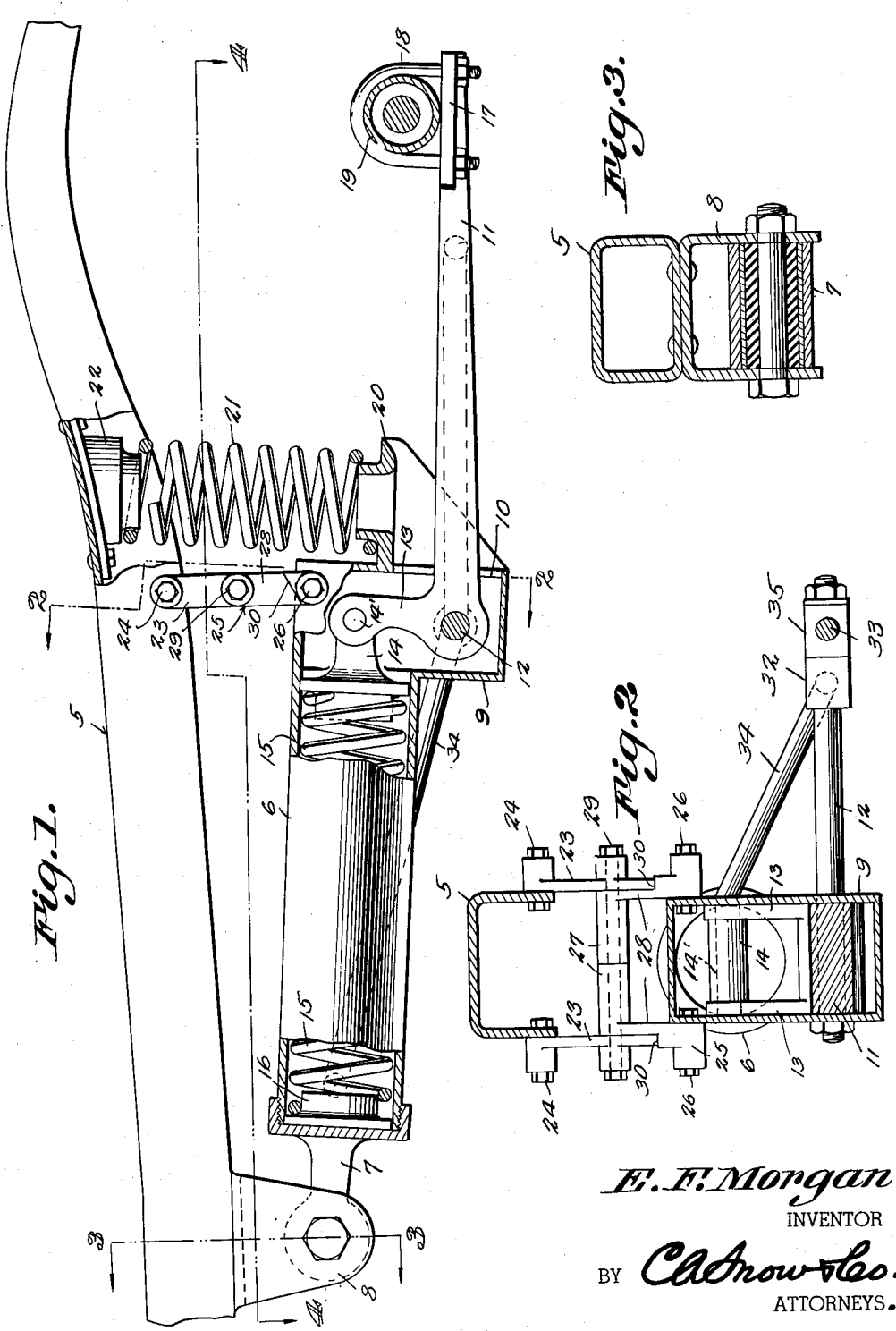
E. F. Morgan
INVENTOR
BY C. A. Snow & Co.
ATTORNEYS.

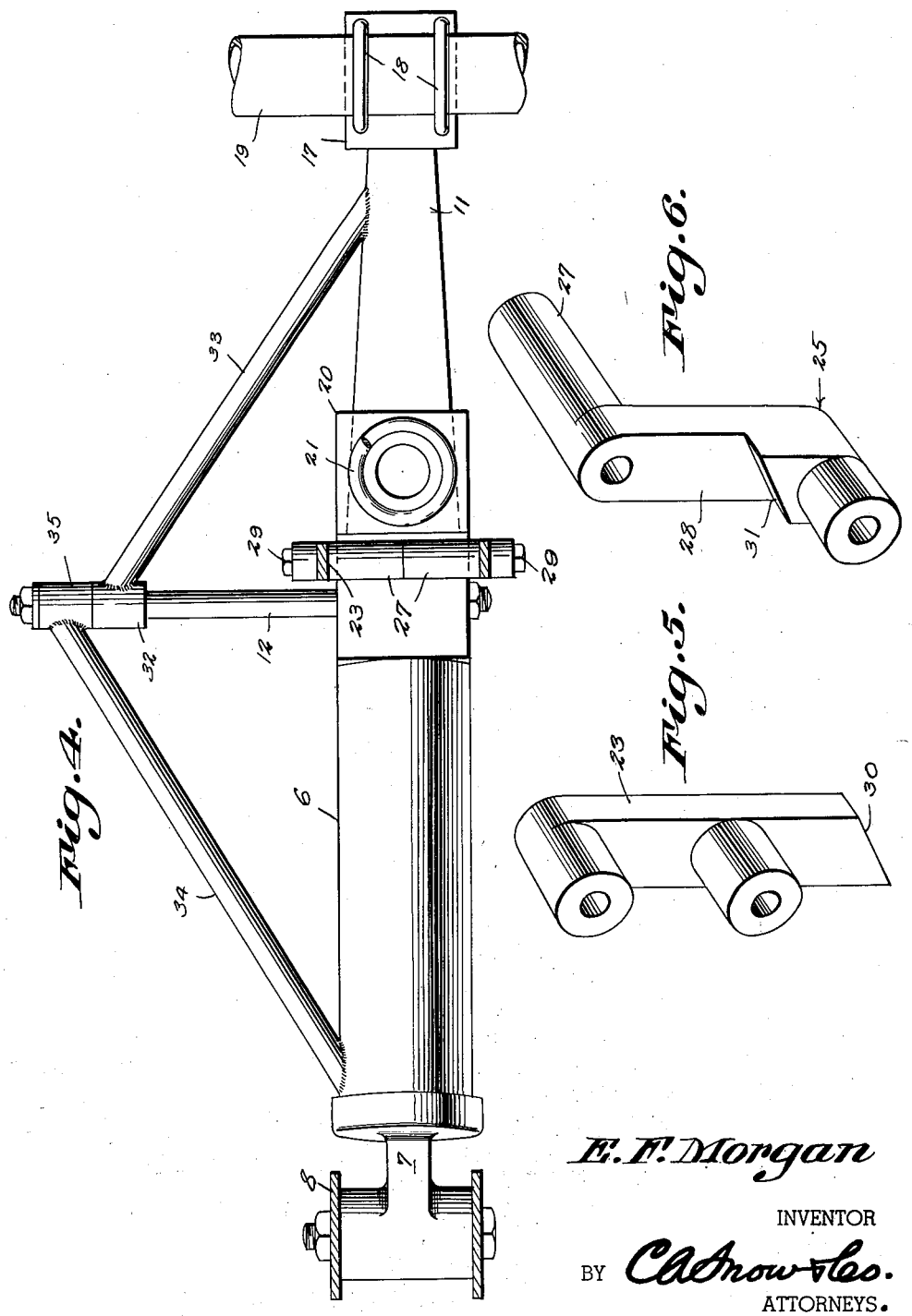

Patented June 6, 1950

2,510,829

UNITED STATES PATENT OFFICE 2,510,829

VEHICLE SPRING SUSPENSION

Everett F. Morgan, New Albany, Ind.

Application May 6, 1949, Serial No. 91,835

4 Claims. (Cl. 267—20)

This invention relates to motor vehicle spring suspension devices, the primary object of the invention being to provide a spring suspension device embodying coiled springs which are recognized as possessing excessive shock absorbing qualities over the usual leaf or elliptical spring commonly employed in motor vehicle construction.

An important object of the invention is to provide a coiled spring suspension device, which will compensate for movement of the wheels of the vehicle incident to the vehicle moving over irregular road surfaces, thereby enhancing the riding qualities of the vehicle equipped with the spring suspension device.

A further object of the invention is to provide a dual spring construction, wherein a horizontal spring is provided and operates as a yieldable wheel suspending device, and a vertical coiled spring cooperating with the horizontal spring in providing a shock absorber to compensate for excessive road shocks.

Another object of the invention is to provide means for preventing lateral or swaying movement of the running gear with respect to the chassis of the vehicle, the side sway preventing means also acting to temporarily restrict the frame and spring axle support against returning to their normal positions too suddenly, to render the spring device ineffective and at the same time provide means for limiting the movement of the body of the vehicle with respect to the running gear, on the rebound.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings:

Figure 1 is a fragmental enlarged elevational view of a spring suspension device constructed in accordance with the invention, portions thereof being shown in section.

Fig. 2 is a sectional view taken on line 2—2 of Fig. 1.

Fig. 3 is a sectional view taken on line 3—3 of Fig. 1.

Fig. 4 is a sectional view taken on line 4—4 of Fig. 1.

Fig. 5 is a perspective view of one section of the shackle used as a part of the invention.

Fig. 6 is a perspective view of the cooperating member of the shackle.

Referring to the drawings in detail, the reference character 5 indicates the side rail of a chassis of a vehicle. It will, of course, be understood that a spring suspension device such as constitutes the subject matter of the present invention, is used in connection with both side rails of a vehicle. However, since the spring suspension devices at opposite sides of the vehicle chassis are identical, only one spring suspension device will be described in detail. The spring device comprises the horizontal cylinder 6, one end thereof being provided with the arm 7 which is pivotally connected with the bracket 8, which depends from the side rail 5, at a point adjacent to the rear end of the side rail 5.

As clearly shown by Fig. 1 of the drawings, the cylinder 6 is provided with a substantially vertical housing 9 formed at the rear end thereof, the housing 9 extending downwardly below the lower surface of the cylinder 6, where it is provided with an opening 10, through which the forward end of the lever 11 extends. This lever 11 has pivotal connection with the shaft 12 and extends through the vertical housing 9. Arms indicated by the reference character 13 extend upwardly at right angles with respect to the forward end of the lever 11 and connect with the head 14 through the pivot pin 14", the head being of a diameter to slide within the cylinder 6, the head being fitted in one end of the coil spring 15 mounted within the horizontal cylinder 6. The opposite end of the coiled spring 15 is fitted over the head 16 secured within the opposite end of the cylinder 6, the head constituting a bearing for the forward end of the spring 15, which is the expansible type.

The rear end of the lever 11 connects with the plate 17, which is formed with openings to accommodate the ends of the inverted U-bolts 18, which fit over the rear axle housing 19 of the vehicle, securing the lever 11 to the rear axle housing.

Extending from one side of the vehicle housing 9, is the spring supporting bracket 20, on which the lower end of the vertical coiled spring 21 is mounted, the upper end of the coiled spring 21 being fitted over the member 22 disposed between the flanges of the side rail. Thus it will be seen that due to this construction, vertical movement of the cylinder 6 with respect to the side rails of the chassis, is restricted.

The shackle forming a part of the present invention, has been designed to prevent side sway of the spring suspension mechanism, with respect to the side rails of the chassis, the shackle at each side of the chassis embodying spaced upper members 23 pivotally connected with the side rail of the chassis at 24. The shackle also includes a lower section 25, pivotally connected with the housing 9 through the medium of the pivots 26 which are in the form of bolts extended through the side walls of the housing 9 at the upper end thereof. These lower sections 25 of the shackle have tubular members 27 formed integral with the arms 28 of the lower sections, the tubular members 27 being of lengths to engage at their inner ends. The tubular members 27 are pivotally connected by means of the bolt 29, on which the upper members and lower sections of the shackle pivot. Thus it will be seen that this shackle construction eliminates side sway of the vehicle.

As clearly shown in Figs. 5 and 6 of the drawings, the members 23 have their lower ends cut at oblique angles, as indicated at 30, which angular end portions of the members 23 are designed to move over the inclined surfaces 31 of the cooperating lower sections of the shackle, thereby restricting pivotal movement of the sections of the shackle in one direction.

As shown by Fig. 1 of the drawings, the connections between the shackle and the housing 9 and side rail 5, are in vertical alinement so that upon vertical movement of the spring suspension device towards the side rail of the chassis, when the shackle is in a position as shown by Fig. 1 of the drawings, will cause the sections of the shackle to pivot with respect to each other and allow for vertical movement of the suspension device with respect to the vehicle chassis. It will also be noted that the shackle will restrict vertical movement of the spring suspension device with respect to the chassis to check vertical movement of the chassis on the rebound, to prevent spring breakage.

As shown by Fig. 4 of the drawings, the shaft 12 extends an appreciable distance beyond the inner surface of the housing 9, where it provides a support for the forward end 32 of the brace rod 33 that is welded to the lever 11. A forward brace rod 34 is connected with the forward end of the cylinder 6 and has its rearward end formed with a bearing 35 mounted for pivotal movement on the shaft 12. This structure adequately braces the suspension device to further prevent side sway.

In operation, it is obvious that when the wheels of the vehicle which are connected with the axle supported within the axle housing 19, move upwardly the arm 13 swings forwardly tensioning the spring 15. Upon further upward movement of the rear wheels and axle, the spring 21 will be tensioned, the spring 21 acting as a shock absorber. With the movement of the spring suspension device with respect to the vehicle chassis, that is when the springs are compressed, the pivoted sections of the shackle will operate, permitting of such vertical movement of the spring suspension device, and at the same time securing the spring suspension device and chassis against side sway.

Having thus described the invention, what is claimed is:

1. The combination with the side rails of a vehicle chassis and the rear axle housing thereof, of a spring suspension device comprising a substantially horizontal cylindrical housing pivotally mounted on the side rail, a coiled expansion spring fitted within the cylindrical housing, a lever pivotally mounted at one end of the housing and being connected at one end with one end of the coiled spring, means for connecting the opposite end of the lever to the rear axle housing, whereby vertical movement of the axle housing, moves one end of the lever against the tension of the spring, restricting movement of the lever and rear axle housing, and a vertical spring disposed between one end of the cylindrical spring housing and the chassis, restricting vertical movement of the cylindrical housing and axle housing.

2. The combination with the side rails of a vehicle chassis and the rear axle housing thereof, of a spring suspension device comprising a substantially horizontal cylindrical housing pivotally mounted on the side rail, a coiled expansion spring fitted within the cylindrical housing, a lever pivotally mounted at one end of the housing and being connected at one end with one end of the coiled spring, means for connecting the opposite end of the lever to the rear axle housing, whereby vertical movement of the axle housing moves one end of the lever against the tension of the spring, restricting movement of the lever and rear axle housing, a vertical spring disposed between one end of the cylindrical spring housing and the chassis, restricting vertical movement of the cylindrical housing and axle housing, and means for limiting movement in opposite directions of the lever and chassis during rebound.

3. The combination with the side rails of a vehicle chassis and the rear axle housing thereof, of a spring suspension device comprising horizontally disposed cylindrical spring housings, coiled springs mounted within the housings, brackets depending from the side rails to which the spring housings are pivotally connected, a lever pivotally connected to one end of each spring housing, means for connecting said levers to the rear axle housing to move therewith and extending at right angles from the levers, said pivoted levers providing a connection between the springs and axle, regulating the vertical movements of the axle, vertical springs mounted between the spring housings and side rails of the vehicle chassis restricting vertical movement of the spring housings and shackles pivotally connected with the side rails of the chassis and cylindrical spring housings, restricting vertical and lateral movement of the cylindrical spring housings with respect to the chassis.

4. The combination with the side rails of a vehicle chassis and the rear axle housing thereof, of a spring suspension device comprising a horizontal cylindrical spring housing, an expansible spring mounted within the spring housing, a head movable within one end of the spring housing in contact with one end of the coiled spring, a lever pivotally connected to the spring housing, an arm extending vertically from one end of the lever, pivotally connected to the head, one end of the lever being connected to the axle housing, a vertical coiled spring connected between said spring housing and chassis, whereby vertical movement of the axle housing and lever exerts pressure on said springs, and shackles connecting the spring housing and chassis restricting side sway of the spring suspenion device with respect to the chassis.

EVERETT F. MORGAN.

REFERENCES CITED

The following references are of record in the file of this patent:

UNITED STATES PATENTS

| Number | Name | Date |
| --- | --- | --- |
| 1,178,639 | Guest | Apr. 11, 1916 |
| 1,681,050 | Robinson | Aug. 14, 1928 |
| 2,419,104 | Wilfert et al. | Apr. 15, 1947 |

FOREIGN PATENTS

| Number | Country | Date |
| --- | --- | --- |
| 268,172 | Great Britain | Mar. 31, 1927 |